US012184176B2

(12) United States Patent
Morelli

(10) Patent No.: US 12,184,176 B2
(45) Date of Patent: Dec. 31, 2024

(54) HIGH VOLTAGE MULTIPLIERS

(71) Applicant: ChargeStar, Inc., Pensacola, FL (US)

(72) Inventor: John Anthony Morelli, Pensacola, FL (US)

(73) Assignee: CHARGESTAR, INC., Pensacola, FL (US)

( * ) Notice: Subject to any disclaimer, the term of this patent is extended or adjusted under 35 U.S.C. 154(b) by 0 days.

(21) Appl. No.: 18/787,231

(22) Filed: Jul. 29, 2024

(65) Prior Publication Data

US 2024/0388205 A1    Nov. 21, 2024

Related U.S. Application Data

(63) Continuation of application No. PCT/US2023/061984, filed on Feb. 3, 2023.

(60) Provisional application No. 63/426,249, filed on Nov. 17, 2022, provisional application No. 63/306,709, filed on Feb. 4, 2022.

(51) Int. Cl.
*H02M 3/158* (2006.01)
(52) U.S. Cl.
CPC ................................. *H02M 3/158* (2013.01)

(58) Field of Classification Search
CPC ....................................................... H02M 3/158
See application file for complete search history.

(56) References Cited

U.S. PATENT DOCUMENTS

| | | | | |
|---|---|---|---|---|
| 4,208,707 A | * | 6/1980 | Olshvang | H02M 1/0845 363/35 |
| 5,796,595 A | * | 8/1998 | Cross | H02M 3/285 363/71 |
| 5,994,963 A | | 11/1999 | Kawai et al. | |
| 2008/0174360 A1 | | 7/2008 | Hsu | |
| 2011/0057616 A1 | * | 3/2011 | Chan | H02J 7/0016 320/134 |
| 2014/0184309 A1 | | 7/2014 | Steeneken et al. | |
| 2017/0085183 A1 | | 3/2017 | Notsch | |
| 2018/0019678 A1 | | 1/2018 | Radic et al. | |
| 2022/0344949 A1 | * | 10/2022 | Morelli | H02J 7/007 |
| 2024/0146194 A1 | * | 5/2024 | Meyvaert | H02M 3/158 |

* cited by examiner

*Primary Examiner* — Rafael O De Leon Domenech
(74) *Attorney, Agent, or Firm* — K&L Gates LLP

(57) ABSTRACT

Various voltage multipliers are disclosed for charging high voltage batteries and/or devices. The voltage multiplier includes an input node configured to receive an input voltage; an output node configured to output an output voltage, where the output voltage is greater than the input voltage. In some examples, an apparatus for the voltage multiplier is integrated with a soft switch device to receive antiphase pulsed inputs through a plurality of stages comprising MOSFETs, diodes, and/or full bridge rectifiers.

13 Claims, 11 Drawing Sheets

HIGH VOLTAGE MULTIPLIERS

PRIORITY CLAIM

This application is a bypass continuation application of International Application No. PCT/US2023/061984, filed on Feb. 3, 2023, which claims priority to U.S. Provisional Patent Application No. 63/306,709, filed on Feb. 4, 2022, and U.S. Provisional Patent Application No. 63/426,249, filed on Nov. 17, 2022, the entireties of which are hereby incorporated by reference and relied upon.

BACKGROUND

As the market for electric vehicles, power tools, laptops, and other electronic devices is booming, there has been an increased demand for batteries as an energy source for these devices. In particular, there have been more demands for high voltage batteries that need to be charged with power (e.g., 480V DC, 960V DC, 48V, 60V) higher than the power that is typically provided by a normal residential utility connection (e.g., 240V AC), or higher than the power that is typically provided by a normal/inexpensive 12V DC power supply (e.g., 12V). Special chargers may be needed to charge these high voltage batteries.

Special chargers and other devices may be needed to charge these high voltage batteries. The special chargers and other devices may require specialized transformers and multipliers (e.g., voltage multipliers). Such specialized transformers and multipliers may require transistors (e.g., MOSFETS), capacitors, diodes, and/or other electronic components that generate less waste heat and/or have lower current ratings. Furthermore, there is a desire and need for the chargers and other devices to be less costly, smaller, less weighty, and safer. There is also a desire and need for an effective failure prevention mechanism for those chargers and devices.

SUMMARY

The present disclosure generally relates to a semiconductor based converters, and more specifically to, voltage multipliers for charging high voltage batteries and/or devices.

In light of the present disclosure, and without limiting the scope of the disclosure in any way, in an aspect of the present disclosure, which may be combined with any other aspect listed herein unless specified otherwise, a voltage multiplier is provided. In an example, the voltage multiplier includes an input node configured to receive an input voltage, an output node configured to output an output voltage, where the output voltage is greater than the input voltage. The voltage multiplier further includes a plurality of booster circuit blocks. The plurality of booster circuit blocks include a first booster circuit block connected to the input node, where the first booster circuit block comprises a first transistor circuit block and a first capacitor circuit block connected to each other in series, where a source of one or more transistors in the first transistor circuit block is connected to the input node; a second booster circuit block connected to the first booster circuit block, where the second booster circuit block comprises a second transistor circuit block and a second capacitor circuit block connected to each other in series, wherein a source of one or more transistors in the second transistor circuit block is connected to a node between the first booster circuit block and the second booster circuit block; and a third booster circuit block connected to the second booster circuit block, where the third booster circuit block comprises a third transistor circuit block and a third capacitor circuit block connected to each other in series, where a source of one or more transistors in the third transistor circuit block is connected to a node between the second booster circuit block and the third booster circuit block; a fourth booster circuit block connected to the third booster circuit block and the output node, where the fourth booster circuit block comprises a fourth transistor circuit block and a fourth capacitor circuit block connected to each other in series, where a source of one or more transistors in the fourth transistor circuit block is connected to a node between the third booster circuit block and the fourth booster circuit block, where the first, second, third, and fourth booster circuit blocks are connected to each other in series.

The voltage multiplier further includes a first half bridge voltage source configured to supply a first power to a gate of the one or more transistors of the first transistor circuit block; a second half bridge voltage source configured to supply a second power to the first capacitor circuit block and the third capacitor circuit block; a third half bridge voltage source configured to supply a third power to a gate of the one or more transistors of the second transistor circuit block and a gate of the one or more transistors of the fourth transistor circuit block; a fourth half bridge voltage source configured to supply a fourth power to the second capacitor circuit block; and a fifth half bridge voltage source configured to supply a fifth power to a gate of the one or more transistors of the third transistor circuit block. The fourth capacitor circuit block is connected to a ground.

In an aspect of the present disclosure, which may be combined with any other aspect listed herein unless specified otherwise, each of the first, second, third, and fourth transistor circuit blocks includes a pair of transistors.

In an aspect of the present disclosure, which may be combined with any other aspect listed herein unless specified otherwise, the first, second, third, and fourth booster circuit blocks operate in an antiphase manner.

In an aspect of the present disclosure, which may be combined with any other aspect listed herein unless specified otherwise, when the one or more transistors in one of the first, second, third, and fourth transistor circuit blocks are turned on, the one or more transistors in an adjacent transistor circuit block are turned off.

In another aspect of the present disclosure, which may be combined with any other aspect listed herein unless specified otherwise, an apparatus for or comprising a capacitively coupled multiplier is provided. The apparatus may include a positive voltage supply and a negative voltage supply. A series of plurality of full bridge rectifier stages may be connected, on either end of the series, to the positive voltage supply and the negative voltage supply, respectively. A capacitor may also be connected, on either end of the capacitor, to the positive voltage supply and the negative supply, respectively, such that the said capacitor is parallel to the series of the plurality of full bridge rectifier stages. Each full bridge rectifier stage may include a full bridge rectifier and a respective pair of capacitors. The respective pair of capacitors may be located on a pair of lines that run in parallel to the full bridge rectifier. For example, for each full bridge rectifier stage, the full bridge rectifier may be coupled, at diametric ends of the full bridge rectifier, to the pair of lines. One end of the pair of lines may comprise a pair of antiphase pulsed input ports configured to receive antiphase pulsed inputs.

In an aspect of the present disclosure, which may be combined with any other aspect listed herein unless specified otherwise, the apparatus may further include a load circuit. The load circuit may be connected, on either end of the load circuit, to the positive voltage supply and the negative voltage supply, respectively. The load circuit may be parallel to the capacitor, and may be parallel to the series of the plurality of full bridge rectifier stages.

In an aspect of the present disclosure, which may be combined with any other aspect listed herein unless specified otherwise, the antiphase pulsed input ports may receive antiphase pulsed inputs from a soft switch. The antiphase pulsed inputs may be antiphase direct currents. The soft switch may include at least a pair of half bridges that is serially connected to a respective pair of inductors, which is serially connected to a corresponding pair of capacitor stages. The soft switch may further include a second inductor located between the half bridges of the pair of half bridges. The inductor value of any one or more of the aforementioned inductors may be chosen so that a resonant frequency may be significantly below a calculated resonant frequency of the system. For example, in at least one embodiment, the inductor value, L, may be expressed as $L \gg 1/((2\pi)^2 \ast C)$, where f is the resonant frequency, and C is the total capacitance represented by the capacitance stages. In some aspects, inserting (e.g., by serially connecting) the pair of first inductors to the pair of half bridges and the pair of capacitance stages may cause the soft switch or the apparatus to generate less heat when operated (e.g., when compared to an apparatus without the pair of first inductors). Also or alternatively, the soft switch or the apparatus may lower its transistor (e.g., MOSFET) current ratings (e.g., when compared to an apparatus without the pair of first inductors). Furthermore, the second inductor may cause the soft switch or the apparatus to even out its transistor (e.g., MOSFET) current over a switching cycle.

In another aspect of the present disclosure, which may be combined with any other aspect listed herein unless specified otherwise, an active capacitive isolator is provided. The active capacitive isolator may include the soft switch, and a plurality of full bridge rectifier stages (collectively referred to herein as a capacitively isolated multiplier (CIM)). The plurality of full bridge rectifier stages may be serially connected to the pair of capacitor banks of the soft switch. The current received from the soft switch may be an antiphase direct current. One or more of the plurality of full bridge rectifier stages may include a full bridge rectifier and a pair of second capacitor banks. The full bridge rectifier may be connected to each second capacitor bank of the pair of second capacitor banks.

In an aspect of the present disclosure, which may be combined with any other aspect listed herein unless specified otherwise, the CIM causes a capacitive isolation between a first branch and a second branch of the CIM. The first branch and the second branch may be serially connected to the pair of capacitor banks of the soft switch. Furthermore, the CIM may cause the capacitive isolation by segmenting current received from the soft switch into high frequency packets that undergo capacitive isolation.

In an aspect of the present disclosure, which may be combined with any other aspect listed herein unless specified otherwise, a first full bridge rectifier stage of the plurality of full bridge rectifier stages can receive an input voltage. The voltage rating of each full bridge rectifier stage of the plurality of full bridge rectifier stages may not exceed a maximum input voltage.

In an aspect of the present disclosure, which may be combined with any other aspect listed herein unless specified otherwise, another apparatus is disclosed. The apparatus may comprise an active power conversion and boost converter, a buck converter, and an active capacitive isolator (e.g., as previously discussed). The active power conversion and boost converter may receive alternating current having a first voltage (e.g., 240 V AC). The active power conversion and boost converter may convert the alternating current into a direct current having a second voltage (e.g., 380 V DC) that is higher than the first voltage. The buck converter may reduce a voltage of the direct current from the second voltage to a third voltage (e.g., 320 V DC). The active capacitive isolator may cause a capacitive isolation between a first branch and a second branch of the active capacitive isolator by segmenting current received from the buck converter into high frequency packets that undergo the capacitive isolation.

In another aspect of the present disclosure, which may be combined with any other aspect, an apparatus for a non-isolated multiplier is disclosed. The apparatus comprises: an input voltage supply; a pair of half bridges connected, at a first end of each half bridge, to the input voltage supply; a pair of inductors respectively connected to the pair of half bridges, wherein a first end of each inductor is connected to a second end of a respective half bridge of the pair of half bridges; a series of a plurality of diode stages connected to the pair of inductors, wherein each diode stage comprises a diode and a capacitor bank; and an output voltage supply connected to one end of the series.

In an aspect of the present disclosure, which may be combined with any other aspect listed herein unless specified otherwise, the pair of inductors comprises a first inductor and a second inductor. The plurality of diode stages comprises a first set of diode stages and a second set of diode stages. The series of the plurality of diode stages alternate between consecutive stages of the first set of diode stages and the second set of diode stages. The first set of diode stages includes a first diode stage connected to the first inductor, and the second set of diode stages includes a second diode stage connected to the second inductor. In some embodiments, the first diode stage is connected to the first inductor based on a connection between a capacitor bank of the first diode stage and the first inductor. The second diode stage is connected to the second inductor based on a connection between a capacitor bank of the second diode stage and the second inductor. In some embodiments, each capacitor bank of the first set of diode stages are connected to each adjacent capacitor bank of the first set of diode stages, each capacitor bank of the second set of diode stages are connected to each adjacent capacitor bank of the second set of diode stages, and each diode of the plurality of diode stages are connected to each adjacent diode of the plurality of diode stages.

In an aspect of the present disclosure, which may be combined with any other aspect listed herein unless specified otherwise, the apparatus may comprise a first line and a second line. The pair of half bridge comprises a first half bridge connected to the first inductor and a second half bridge connected to the second inductor. The first line comprises the first half bridge, the first inductor, and the first set of diode stages. The second line comprises the second half bridge, the second inductor, and the second set of diode stages. The first line and the second line receive antiphase pulsed inputs from the input voltage supply.

In an aspect of the present disclosure, which may be combined with any other aspect listed herein unless specified otherwise, the first set of diode stages comprises N diode stages, wherein the second set of diode stages comprises N or N-1 diode stages.

In an aspect of the present disclosure, which may be combined with any other aspect listed herein unless specified otherwise, an inductor value, L, of the pair of inductors is chosen so that $L \gg 1/((2\pi f)^2 *C)$, wherein f is the switching frequency of the pair of half bridges, and C is the total capacitance represented by the series of the plurality of diode stages.

In an aspect of the present disclosure, which may be combined with any other aspect listed herein unless specified otherwise, the voltage rating of the apparatus is 2× of the input voltage supply.

In an aspect of the present disclosure, which may be combined with any other aspect listed herein unless specified otherwise, a diode of a last stage of the series of the plurality of diode stages is connected to the output voltage supply.

The reader will appreciate the foregoing details, as well as others, upon considering the following detailed description of certain non-limiting embodiments including a voltage multiplier of the same according to the present disclosure.

DETAILED DESCRIPTION

Figure 1:
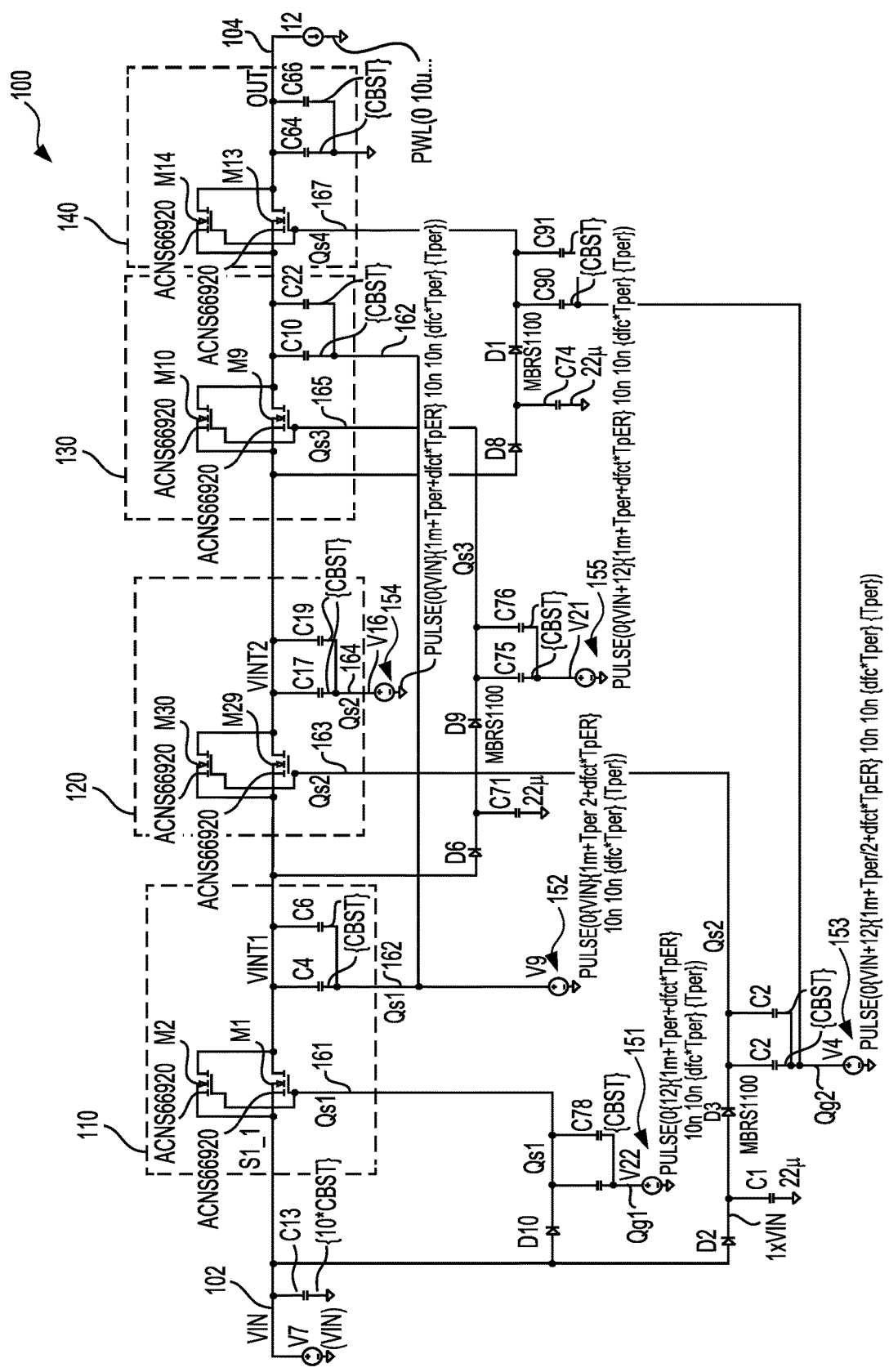
FIG. 1 is a circuit diagram illustrating a voltage multiplier circuit according to an example of the present disclosure.

The present disclosure generally relates to semiconductor based converters, and more specifically to, voltage multipliers. Such voltage multipliers may be used to effectively charge high voltage batteries and/or devices through the use of, and/or through the special configuration of transistors (e.g., MOSFETs), capacitors, diodes, rectifiers, half bridges, and/or other electronic components that generate less waste heat and/or have lower current ratings. Furthermore, the integrated circuits of the presently disclosed voltage multipliers are less costly, smaller, less weighty, and/or safer (e.g., through effective failure prevention mechanism). For example, as will be described herein, some embodiments of the present disclosure describe a voltage multiplier that is optimized for low power loss through the use of a plurality of stages comprising MOSFET gate drivers. Additionally, some embodiments of the present disclosure describe voltage multipliers optimized for minimizing voltage ratings, for example, through the use of an actively isolated circuit comprising a plurality of stages based on full bridge rectifiers. Furthermore, some embodiments of the present disclosure describe voltage multipliers optimized for cost and simplicity, for example, through the use of a plurality of stages comprising diodes and capacitor banks, as will be described herein. Various embodiments of the voltage multipliers described herein may utilize antiphase pulsed inputs (e.g., antiphase currents and/or voltages) to deliver the aforementioned benefits. In some aspects, the antiphase pulsed inputs may be provided to the voltage multiplier through the use of, or an integration with, a soft switch device described herein. As used herein, and unless indicated otherwise, an apparatus for any voltage multiplier described herein may collectively refer to the soft switch and the voltage multiplier that is integrated with the soft switch. The voltage multipliers or apparatuses thereof described in the present disclosure can be used for a smart phone, a laptop computer, an electrical vehicle, power tools, a solar energy system, or any other electronic device, for example, requiring high voltage batteries/chargers.

In some embodiments, any one of the various voltage multiplier described herein may be used in a battery charging systems described in U.S. patent application Ser. No. 17/727,205, the entirety of which is hereby incorporated by reference herein. For example, the voltage multipliers described in the present disclosure may be used additionally or alternatively to one or more multiplier parts of the voltage multipliers described in U.S. patent application Ser. No. 17/727,205.

Voltage Multipliers Using MOSFETs

At least some aspects of the present disclosure provide a voltage multiplier which is an improvement on the Dickson based voltage multiplier where MOSFETs are used in place of diodes to boost DC voltages. In some embodiments, the voltage multiplier according to the present disclosure may use a synchronous diode based DC boost for the gate driver. Improvements may come from the very low Rds(on) (on resistance) for MOSFETS, for example, when compared to the Vf(forward voltage drop) of diodes. Moreover, since MOSFETs have a positive temperature coefficient, as opposed to the negative temperature coefficient of diodes, the voltage multiplier according to the present disclosure can be used in parallel for additional power conversion capacity.

According to an embodiment of the present disclosure, the voltage multiplier may include a series of stages of MOSFET(s) followed by capacitor banks connected to the drains of the MOSFETS and a half-bridge switching between ground and Vin. The stages may operate in an antiphase manner with a small dead time to ensure that consecutive stages of MOSFETS are never on at the same time. Each stage may increase the output voltage, for example, by Vin (e.g., 48V, 72V, 96V, . . . ).

The Vgs to turn on the MOSFETS may be generated by taking power from the previous stage and switching a capacitor from ground to Vin+Vgs (generated by a boost converter fed into the half bridge). The first stage is unique in that the capacitor used to drive the gate of the first MOSFETs in the chain switches from 0 to Vgs.

The repeating nature of the alternate phase stages may mean that a system of any number of stages can be driven at least by only five half bridges (e.g., five half bridge voltage sources). The efficiency of the system can be made arbitrarily high through the use of parallel MOSFETS and capacitor banks.

FIG. 1 is a circuit diagram illustrating a voltage multiplier circuit 100 according to an example of the present disclosure. This circuit diagram may be an example of a 24V to 96V boost converter that with additional paralleled MOSFETs and capacitors has yielded 97% efficiency across all power loads.

In some examples, the voltage multiplier 100 may include an input node 102 configured to receive an input voltage (e.g., 24V), and an output node 104 configured to output an output voltage (e.g., 96V), where the output voltage is greater than the input voltage. The voltage multiplier 100 may further include a plurality of booster circuit blocks. In some examples, the plurality of booster circuit blocks may include a first booster circuit block 110, a second booster circuit block 120, a third booster circuit block 130, and/or a fourth booster circuit block 140.

The first booster circuit block 110 may be connected to the input node 102. The first booster circuit block 110 may include a first transistor circuit block (e.g., paralleled transistors M1, M2) and a first capacitor circuit block (e.g., capacitor banks having capacitors C4, C6) connected to each other in series. A source of one or more transistors in the first transistor circuit block 110 may be connected to the input node 102.

The second booster circuit block 120 may be connected to the first booster circuit block 110. The second booster circuit block 120 may include a second transistor circuit block (e.g., paralleled transistors M29, M30) and a second capacitor circuit block (e.g., capacitor banks having capacitors C17, C19) connected to each other in series. A source of one or more transistors in the second transistor circuit block 120 may be connected to a node between the first booster circuit block 110 and the second booster circuit block 120.

The third booster circuit block 130 may be connected to the second booster circuit block 120. The third booster circuit block 130 may include a third transistor circuit block (e.g., paralleled transistors M9, M10) and a third capacitor circuit block (e.g., capacitor banks having capacitors C10, C22) connected to each other in series. A source of one or more transistors in the third transistor circuit block 130 may be connected to a node between the second booster circuit block 120 and the third booster circuit block 130.

The fourth booster circuit block 140 may be connected to the third booster circuit block 130 and the output node 104. The fourth booster circuit block 140 may include a fourth transistor circuit block (e.g., paralleled transistors M13, M14) and a fourth capacitor circuit block (e.g., capacitor banks having capacitors C64, C66) connected to each other in series. A source of one or more transistors in the fourth transistor circuit block 140 may be connected to a node between the third booster circuit block 130 and the fourth booster circuit block 140. The first, second, third, and fourth booster circuit blocks 110, 120, 130, 140 may be connected to each other in series.

In some examples, the voltage multiplier 100 may further include a first half bridge voltage source 151, a second half bridge voltage source 152, a third half bridge voltage source 153, a fourth half bridge voltage source 154, and a fifth half bridge voltage source 155. The first half bridge voltage source 151 may be configured to supply a first power to a gate of the one or more transistors (e.g., M1, M2) of the first transistor circuit block. The second half bridge voltage source 152 may be configured to supply a second power to the first capacitor circuit block (e.g., C4, C6) and the third capacitor circuit block (e.g., C10, C22). The third half bridge voltage source 153 may be configured to supply a third power to a gate of the one or more transistors (e.g., M29, M30) of the second transistor circuit block and a gate of the one or more transistors (e.g., M13, M14) of the fourth transistor circuit block. The fourth half bridge voltage source 154 may be configured to supply a fourth power to the second capacitor circuit block (e.g., C17, C19). The fifth half bridge voltage source 155 may be configured to supply a fifth power to a gate of the one or more transistors (e.g., M9, M10) of the third transistor circuit block. The fourth capacitor circuit block (e.g., C64, C66) may be connected to a ground.

In the above examples, four booster circuit blocks are described, but in some other examples, the voltage multiplier according to the present disclosure may include any other number of booster circuit blocks (e.g., 3, 5, 6, 7, 8, 9, 10, . . . ). However, given the repeating nature of the alternate phase stages, even if the number of booster circuit blocks increases (e.g., 5, 6, 7, 8, 9, 10, . . . ), the voltage multiplier can be driven by using only five half bridges (e.g., five half bridge voltage sources). For example, the first half bridge voltage source 151 may supply a first power to the one or more transistors (e.g., M1, M2) of the first transistor circuit block; the second half bridge voltage source 152 may supply a second power to the odd number capacitor circuit blocks (e.g., first, third, fifth, . . . ), except for the last capacitor circuit block that may be connected to the ground; the third half bridge voltage source 153 may supply a third power to the one or more transistors of the even number transistor circuit blocks (e.g., second, fourth, sixth, . . . ); the fourth half bridge voltage source 154 may supply a fourth power to the even number capacitor circuit blocks (e.g., second, fourth, sixth, . . . ), except for the last capacitor circuit block that may be connected to the ground; and the fifth half bridge voltage source 155 may supply a fifth power to the one or more transistors of the odd number transistor circuit blocks (e.g., third, fifth, seventh, . . . ), except for the first transistor circuit block.

In some examples, when there are less than four booster circuit blocks, there might be less than five half bridge voltage sources. In some examples, the voltage multiplier may include more than five half bridge voltage sources (6, 7, 8, 9, 10, . . . ).

The gate-source voltage Vgs to turn on the transistors of each of transistor circuit blocks may be generated by taking power from the previous stage and switching a capacitor from ground to Vin+Vgs (generated by a boost converter fed into the half bridge). The first stage may be unique in that the capacitor used to drive the gate of the first transistor circuit block in the chain switches from 0 to Vgs.

In some examples, each of the first, second, third, and fourth transistor circuit blocks may include a pair of transistors connected to each other in parallel. In other examples, each of the first, second, third, and fourth transistor circuit blocks may include any other number of transistors (e.g., 1, 3, 4, 5, 6, 7 . . . ). In some examples, each of the first, second, third, and fourth capacitor circuit blocks may include a pair of capacitors connected to each other in parallel. In other examples, each of the first, second, third, and fourth capacitor circuit blocks may include any other number of capacitors (e.g., 1, 3, 4, 5, 6, 7 . . . ).

Figure 2:
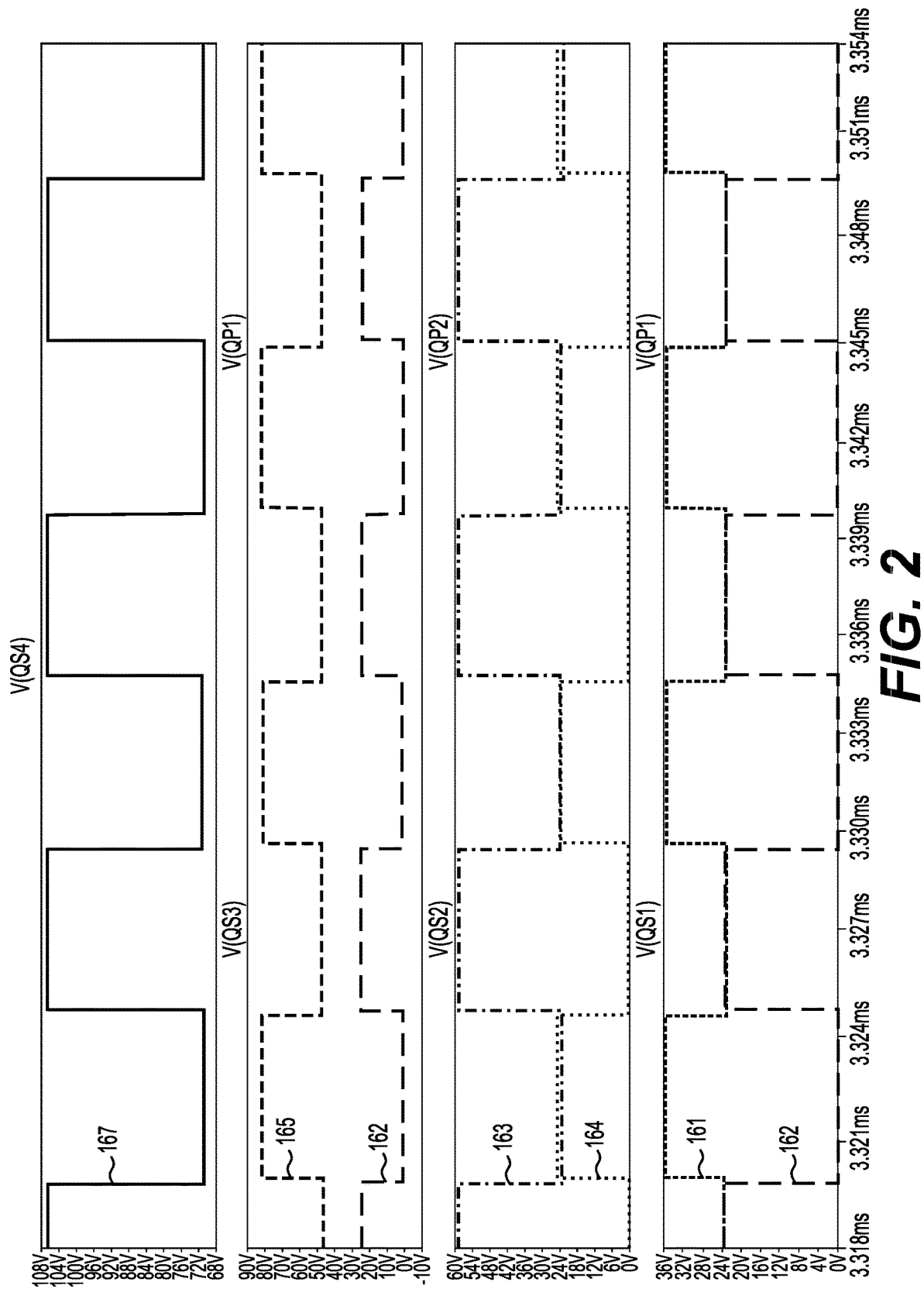
FIG. 2 illustrates example waveforms of certain nodes in the voltage multiplier circuit of FIG. 1.

In some examples, the plurality of booster circuit blocks (e.g., the first, second, third, and fourth booster circuit blocks 110, 120, 130, 140) may operate in an antiphase manner. For example, when the one or more transistors in one of the first, second, third, and fourth transistor circuit blocks are turned on, the one or more transistors in an adjacent transistor circuit block are turned off. Also, in a given booster circuit block, the transistor circuit block and the capacitor circuit block may be driven in antiphase manner (e.g., when an on-signal is supplied to the transistor circuit block, an off-signal is supplied to the capacitor circuit block from the corresponding half bridge voltage source). FIG. 2 illustrates example waveforms of certain nodes (161, 162, 163, 164, 165, 167) in the voltage multiplier circuit of FIG. 1. These waveforms show an example antiphase operation of the voltage multiplier with a small dead time, which may ensure that consecutive stages of transistors are not on at the same time.

In this way, aspects of the present disclosure may provide a voltage multiplier that may be an improvement on the Dickson based voltage multiplier. The transistors (e.g., MOSFETs) are used in place of diodes to boost DC voltages and the gates of the transistors are actively turned on/off by the half bridge voltage sources in an antiphase manner. This circuit configuration of the voltage multiplier according to the present disclosure may reduce the overall power consumption and overheating significantly and, thus, unlike the conventional voltage multiplier, would require no or less heat sink, thereby leading to a significant reduction in the size and weight of the voltage multiplier device or any device incorporating the voltage multiplier device.

Capacitively Coupled Multipliers

At least some aspects of the present disclosure generally relate to an apparatus for voltage multipliers that are novel and nonobvious improvements of Cockroft Walton Multipliers (CWMs). For example, an apparatus for a capacitively coupled multiplier is disclosed in this present disclosure for a power supply and/or a battery charger. Furthermore, some aspects of the present disclosure generally relate to novel and nonobvious components for the apparatus for the voltage multipliers, including, for example, a soft switch device described herein that can be integrated with any of the voltage multipliers described herein.

Figure 3A:
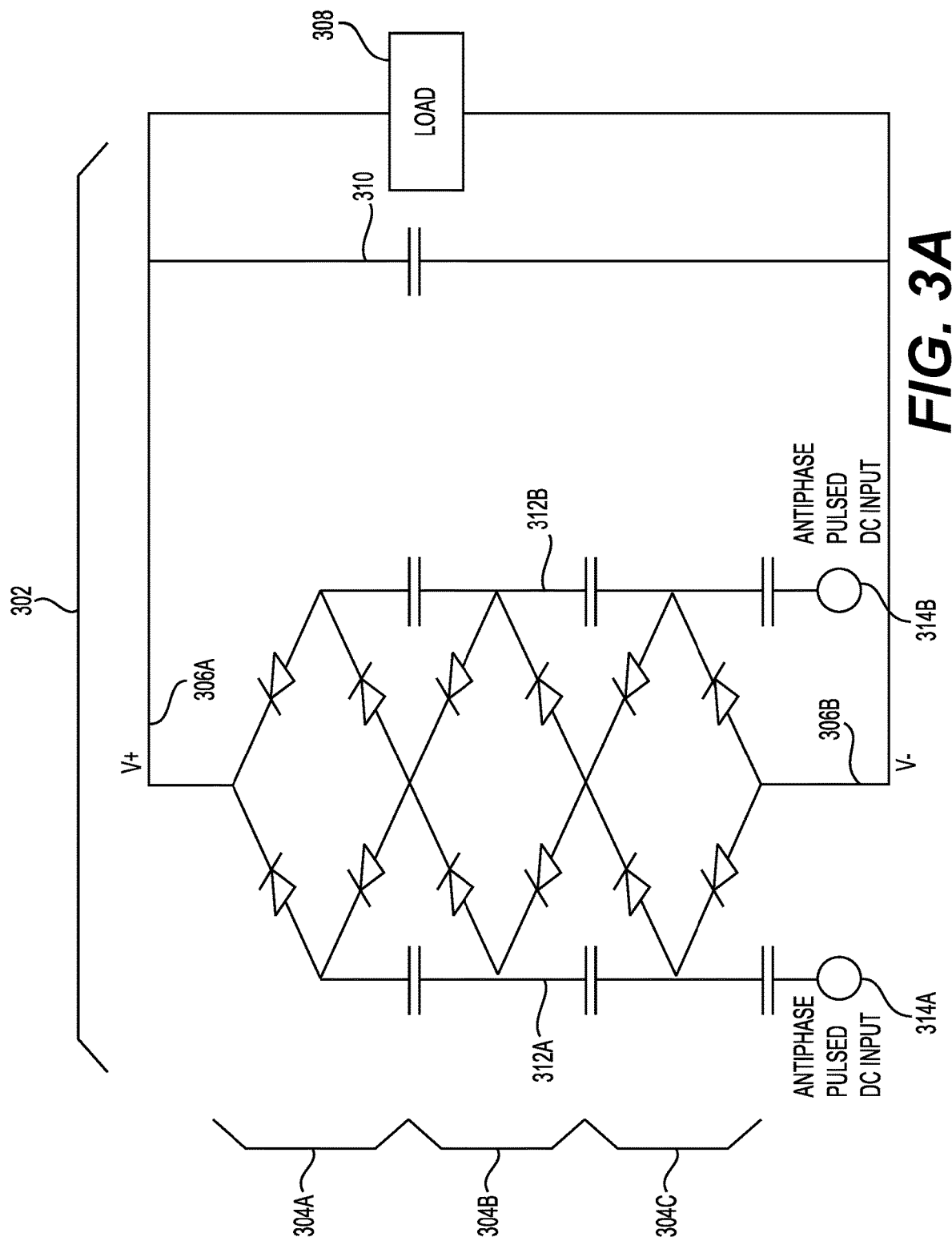
FIG. 3A is a diagram showing an example capacitively coupled multiplier, in accordance with a non-limiting embodiment of the present disclosure.

FIG. 3A is a diagram showing an example capacitively coupled multiplier 302, in accordance with a non-limiting embodiment of the present disclosure. As shown in FIG. 3A, the capacitively coupled multiplier 302 may include a plurality of full bridge rectifier stages 304A-304C that may be serially connected between positive and negative voltage supplies (e.g., V+ and V−, respectively). For example, the first full bridge rectifier stage 304A may be connected to the positive voltage supply 306A and the last full bridge rectifier stage 304C may be connected to the negative voltage supply 306B. Furthermore, a load circuit 308 and a capacitor circuit 310 may each be parallel to the plurality of full bridge rectifier stages 304A-304C.

Each full bridge rectifier stage may include a full bridge rectifier coupled to two parallel lines (e.g., electrical conductance paths), 312A and 312B, respectively. Each parallel line may comprise a series of capacitors as shown. For example, while full bridge rectifier stages may be serially connected via the full bridge rectifiers, each full bridge rectifier may be coupled, on its diametric ends by a pair of lines (e.g., a line for each respective diametric end) comprising serially connected capacitors. Thus, each of the pair of lines 312A-312B may be coupled to a respective diametric end of each full bridge rectifier, resulting in a pair of capacitors at each full bridge rectifier stage. In some aspects, one end of the pair of lines may comprise a pair of antiphase pulsed input ports, 314A and 314B. The antiphase pulsed input ports, 314A and 314B may be configured to receive antiphase pulsed inputs direct current. However, in some aspects, the inputs may be alternating current.

Soft Switch For Capacitively Coupled Multipliers

Figure 3B:
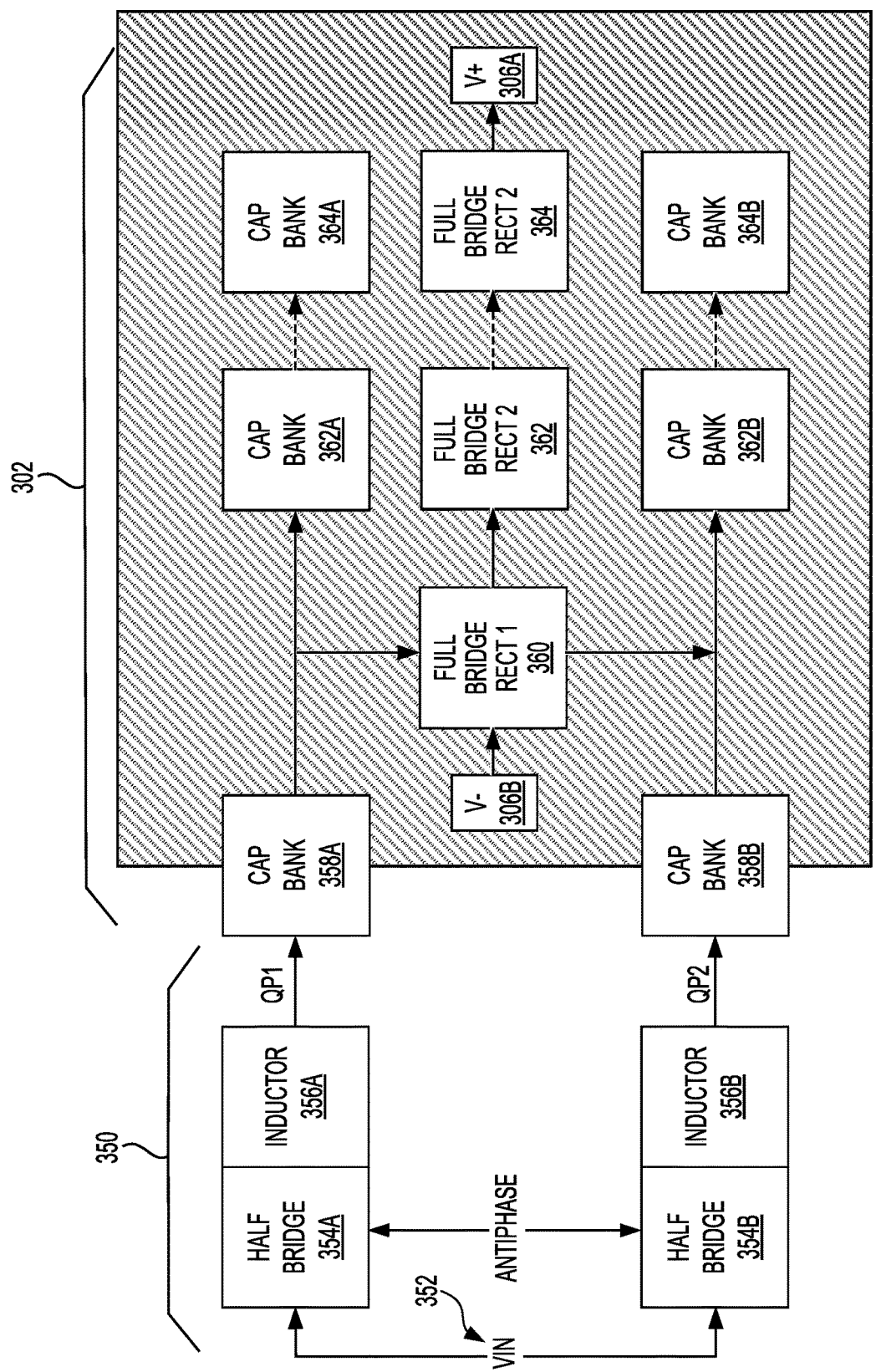
FIG. 3B is a diagram showing an example capacitively coupled multiplier integrated with a soft switch, in accordance with a non-limiting embodiment of the present disclosure.

In some embodiments, the antiphase pulsed inputs may be provided via a soft switch device (soft switch). FIG. 3B is a diagram showing an example capacitively coupled multiplier 302 of FIG. 3A that is integrated with an example soft switch 350, in accordance with a non-limiting embodiment of the present disclosure. As shown in FIG. 3B, the soft switch 350 may be respectively coupled to capacitors 358A and 358B of the last full bridge rectifier stage of the capacitively coupled multiplier 302 (e.g., via the antiphase pulsed input ports, 314A and 314B of FIG. 3A). The example soft switch 350 may include a pair of half bridges 354A-354B serially connected to a corresponding pair of inductors 356A-356B. In some aspects, the soft switch is integrated with the capacitively coupled multiplier 302 based on a serial connection between the pair of inductors 356A-356B and the corresponding pair of capacitor banks 358A-358B of the last full bridge rectifier stage of the capacitively coupled multiplier 302. The pair of lines 312A-312B previously described in relation to FIG. 3A may comprise a serially connected path stemming from the pair of capacitor banks 354A-254B, which interfaces with the soft switch 302, and running through each pair of capacitor banks of each full bridge rectifier stage of the capacitively coupled multiplier 302 (e.g., capacitor banks 362A-362B and 364A-364B, etc.). The current received from the soft switch may originate from an input voltage supply 352. Furthermore, the connection between the input voltage supply 352 and the pair of half bridges 354A-354B and the pair of inductors 356A-356B may result in an antiphase direct current being output from the soft switch 350 to the capacitively coupled multiplier 302. For example, while one line of the pair of lines 312A-312B yields a high signal, the other line of the pair of lines 312A-312B yields a low signal, and vice versa (e.g., causing a push-pull dynamic across the pair of lines of the capacitively coupled multiplier 302). Although FIG. 3B shows three full bridge rectifier stages (based on full bridge rectifiers 360, 362, and 364 and their respective pairs of capacitor banks), it is contemplated that there can by any number of full bridge rectifier stages. As previously discussed in relation to FIG. 3A, the various full bridge rectifier stages may be sandwiched (e.g., through connections) between a positive voltage supply 306A and a negative voltage supply 306B, and thus may be isolated.

In some embodiments, the soft switch 350 implemented in the capacitively coupled multiplier 302 or the active capacitive isolator may comprise additional pairs of half bridges, additional inductors (in which case inductors 356A-356B may be referred to as first inductors), and/or may comprise at least a pair of capacitance stages. Each pair of half bridges may be serially connected to a corresponding pair of first inductors (of the at least the pair of inductors), and each pair of first inductors may be serially connected to a corresponding pair of capacitance bridges (e.g., of the at least the pair of capacitance bridges). Furthermore the pair of half bridges may receive an input voltage source. The soft switch may further comprise another inductor or inductors (referred to herein as a second inductor or second inductors, respectively). Each of the one or more second inductors may be situated between and/or connect half bridges of a given pair of half bridge.

In some embodiments, a half bridge may comprise a transistor gate driver (e.g., MOSFET gate driver) that generates a low-side and a high-side signal together. In some embodiments, each capacitance stage may comprise a capacitor bank associated with a stage.

In some embodiments, the inductor value of any one or more of the aforementioned inductors may be chosen so that a resonant frequency of the one or more inductors may be significantly below a calculated resonant frequency of the system (e.g., the soft switch). For example, in at least one embodiment, the inductor value, L, may be expressed as $L \gg 1/((2\pi f)^2 * C)$, where f is the resonant frequency, and C is the total capacitance represented by the capacitance stages.

In some embodiments, the pair of inductors 356A-356B of the soft switch 250 (e.g., one for each of the anti-phase half-bridges 354A-354B) may be coupled. In other embodiments, the pair of inductors 356A-356B may be uncoupled.

The soft switch may replace and/or provide novel and nonobvious improvements upon conventional multipliers (e.g., Cockroft Walton Multipliers (CWMs) as will be described in FIG. 4), generators, and/or transistor-based devices, by generating less waste heat and/or lower transistor (e.g., MOSFET) current ratings. For example, various components of the soft switch (e.g., inductors) may smooth out a current waveform being output, causing the maximum current rating of transistors (e.g., MOSFET) using in the half-bridges. Thus, the current flowing through the soft switch may be lower than conventional multipliers, generators, and/or transistor-based devices, allowing the use of less expensive and/or more capable components in electronic devices.

The arrangement of the capacitively coupled multiplier 302, as shown in FIGS. 3A and 3B, allows various components of the multiplier (e.g., the diodes and capacitors of the plurality of full bridge rectifier stages 304A-304C) to require a lower voltage rating (e.g., 1 times the input voltage rating) than in conventional multipliers. For example, the voltage rating of each full bridge rectifier stage of the plurality of full bridge rectifier stages may not exceed a maximum input voltage. In contrast, conventional multipliers, such as the Cockroft-Walton Multiplier (CWM) may often require components to have a higher voltage rating (e.g., two times the input voltage rating). The lower voltage rating requirement may lower the cost associated with the design of the capacitively coupled multiplier.

Cockroft-Walton Multiplier

Figure 4:
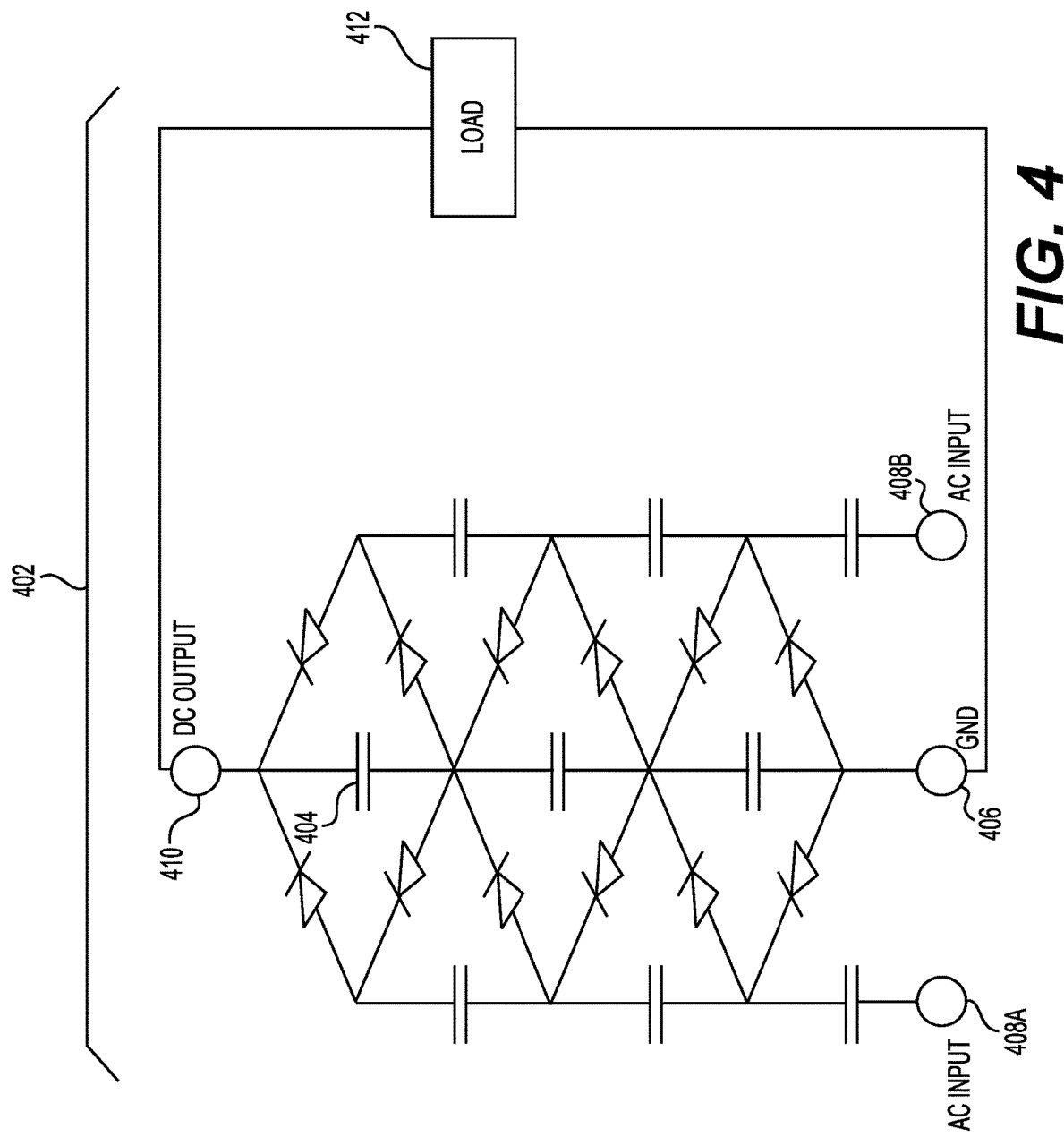
FIG. 4 is a diagram showing a conventional Cockroft-Walton Multiplier (CWM).

FIG. 4 is a diagram showing a conventional Cockroft-Walton Multiplier (CWM) 402. As can be seen from a comparison of FIGS. 3A and 4, unlike the example capacitively coupled multiplier 302 described in FIGS. 3A and 3B, the Cockroft-Walton Multiplier 402 involves a capacitor (e.g., capacitor 404) within each full bridge rectifier, thus forming an extra line of serially connected capacitors, which reduces the ability of the multiplier to have isolation in the power supply. Furthermore, an absence of a parallel capacitor (e.g., capacitor 310) in the Cockroft-Walton Multiplier 402 also contributes to a reduction of isolation and safety. Even further, instead of having a positive and negative voltage supply, the Cockroft-Walton Multiplier 402 is grounded 406 and requires AC inputs 408A-408B, in order to generate a DC output 410 for a load 412.

Other Embodiments of the Capacitively Coupled Multiplier

In some embodiments, the apparatus may comprise or further comprise an active capacitive isolator and/or may include components (e.g., an active power conversion and boost converter, a buck converter, etc.) in addition to the active capacitive isolator. Also or alternatively, the active capacitive isolator may be a modification of the above described capacitively coupled multiplier. The active capacitive isolator may include a soft switch and a plurality of full bridge rectifier stages (collectively referred to herein as a capacitively isolated multiplier (CIM)). An example soft switch may include a pair of half bridges serially connected to a corresponding pair of inductors and a corresponding pair of capacitor banks. The plurality of full bridge rectifier stages may be serially connected to the pair of capacitor banks. The current received from the soft switch may be an antiphase direct current. For example, while one half bridge of the pair of half bridges yields a high signal, the other half bridge of the pair of half bridges yields a low signal, and vice versa (e.g., causing a push-pull dynamic across a first and a second branch of the active capacitive isolator).

In some aspects, one or more of the plurality of full bridge rectifier stages may include a full bridge rectifier and a pair of second capacitor banks (these capacitor banks of the CIM are referred to as second capacitor banks to distinguish from the capacitor banks of the soft bridge). Furthermore, one of the full rectifier stages (referred to herein as a first full bridge rectifier stage) may receive an input voltage, while another one of the full bridge rectifier stages (e.g., the last full bridge rectifier stage) may generate an output voltage. In some aspects, the output voltage may be a multiple of the input voltage. The voltage rating of each full bridge rectifier stage of the plurality of full bridge rectifier stages may not exceed a maximum input voltage. The full bridge rectifier may be connected to each second capacitor bank of the pair of second capacitor banks. An example full bridge rectifier may comprise multiple (e.g., four) diodes. In some aspects, each full bridge rectifier stage may allow interaction among components of the given stage (e.g., the full bridge rectifier and the pair of second capacitor banks). In contrast, for example, interaction between the full bridge rectifier stages may be more restricted.

In some embodiments, the CIM causes a capacitive isolation between a first branch and a second branch of the active capacitive isolator (e.g., the CIM after the soft switch). The first branch and the second branch may be serially connected to the pair of capacitor banks of the soft switch. Furthermore, the CIM may cause the capacitive isolation by segmenting current received from the soft switch into high frequency packets that undergo capacitive isolation.

Circuit Diagram of An Example Apparatus for the Capacitively Coupled Multiplier

Figure 5:
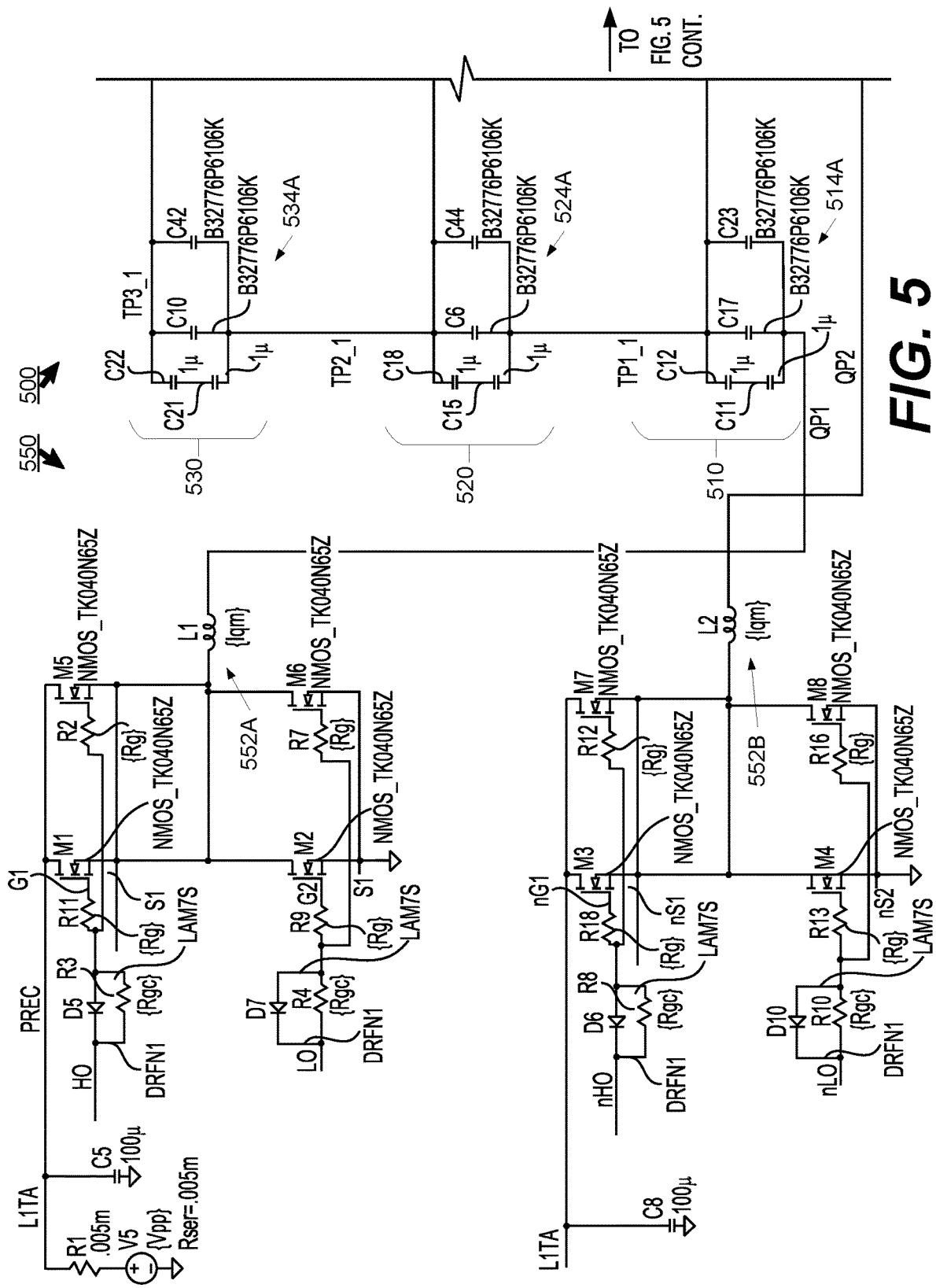
FIG. 5 is a circuit diagram illustrating an example capacitively coupled multiplier integrated with a soft switch, in accordance with a non-limiting embodiment of the present disclosure.
Figure 5:
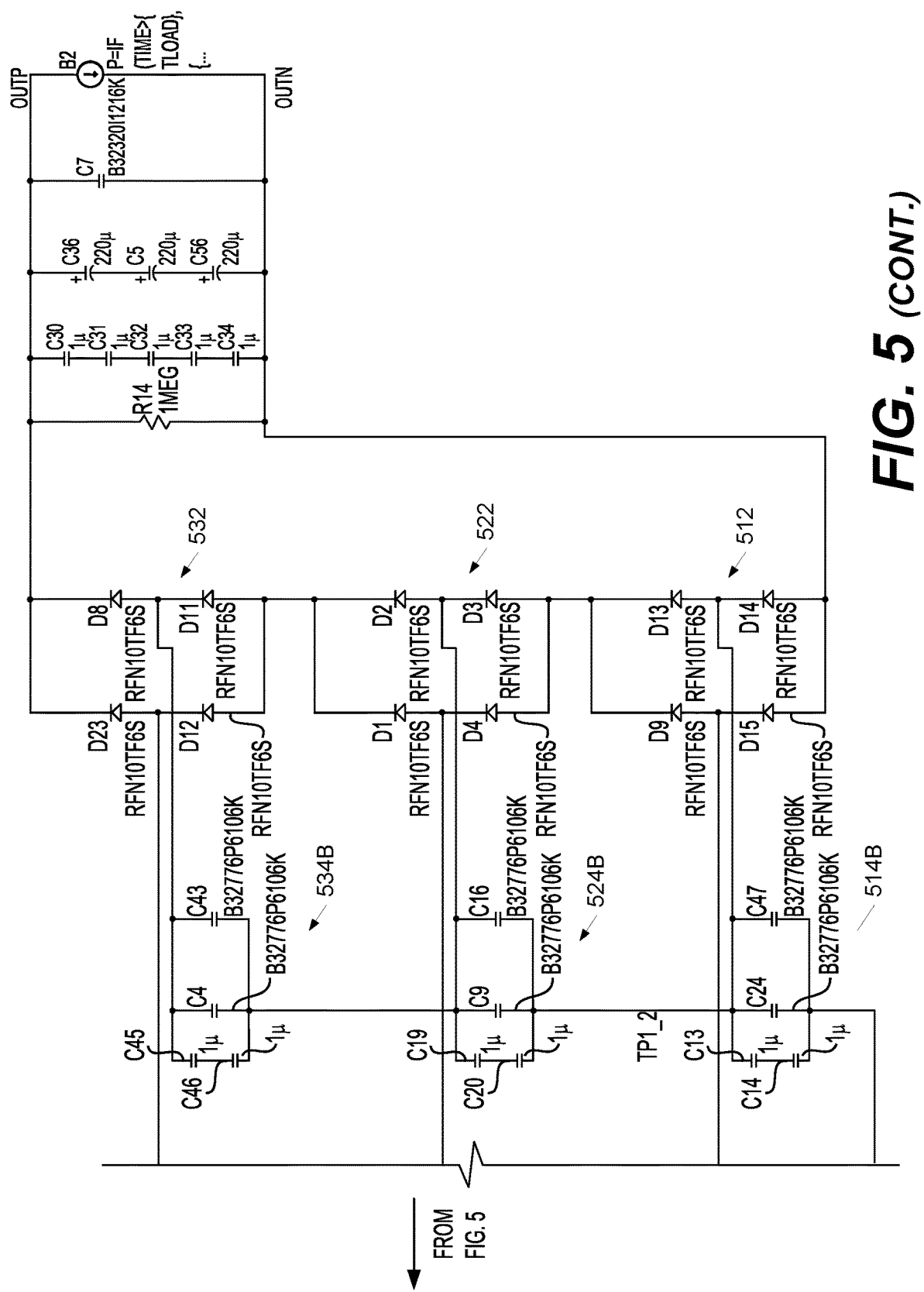

FIG. 5 is a circuit diagram illustrating an example capacitively coupled multiplier integrated 500 with a soft switch 550, in accordance with a non-limiting embodiment of the present disclosure. As shown in FIG. 5, the circuit diagram includes a plurality of full bridge rectifier stages 510, 520, and 530, characterized by the plurality of respective full bridge rectifiers 512, 522, and 532, and a pair of capacitor banks 514A-514B, 524A-524B, and 534A-534B, for each respective full bridge rectifier. The full bridge rectifier is shown as comprising four diodes. Furthermore, each capacitor bank is shown to have one or more capacitors. The circuit diagram also shows the soft switch 550, including the components previously described in relation to FIG. 3A. For example, the soft switch 550 includes a pair of inductors 552A-552B coupled to the pair of capacitor banks 514A-514B of the first full bridge rectifier stage 510.

In some embodiments, the systems, methods, and techniques described for capacitively coupled multipliers or active capacitive isolators may include novel and nonobvious improvements to conventional multipliers (e.g., a Cockroft-Walton Multiplier (CWM)) or transformers by providing isolated power supplied, for example, to isolate one part of a circuit (e.g., of a capacitively coupled multiplier or an active capacitive isolator) from another part (e.g., a mains AC power). In some aspects, the isolation may allow an operator to effectively isolate defective components of a system from being used (e.g., as a failure prevention mechanism). Furthermore, the isolation may reduce the hazard of being electrocuted. Even further, unlike other electronic devices (e.g., transformers), the capacitively coupled multiplier and/or the active capacitive isolator can allow the use of high frequency currents so that significant power can be harnessed through the various capacitors and capacitor banks.

In some embodiments, an apparatus is disclosed that may, in addition to the capacitively coupled multiplier or active capacitive isolator, further comprise an active power conversion and boost converter and a buck converter. The active power conversion and boost converter may receive alternating current having a first voltage (e.g., 240 V AC). The active power conversion and boost converter may convert the alternating current into a direct current having a second voltage (e.g., 380 V DC) that is higher than the first voltage. The buck converter may reduce a voltage of the direct current from the second voltage to a third voltage (e.g., 320 V DC).

Non-Isolated Voltage Multiplier And Integration With Soft Switch

Various embodiments of the present disclosure are also directed to a non-isolated voltage multiplier. The non-isolated voltage multiplier may include specialized components arranged in novel and nonobvious configurations to optimize cost and simplicity, while maintaining relatively low voltage ratings. As will be discussed in more detail in conjunction with subsequent figures, the non-isolated voltage multiplier may provide these benefits by relying on a plurality of stages based on diodes (e.g., instead of MOSFETs), serially connected pairs of capacitor banks corresponding to each of the diode stages, and a pair of inductors added to half bridges (e.g., as part of the previously described soft switch subcomponent). For example, the use of diodes for the stages eliminates or reduces the need for stage control. The serially connected capacitor banks may allow for a voltage rating of about 2× or less, and this voltage rating may be unaffected by the number of stages. Furthermore, the use of the inductor (e.g., as part of the soft switch subcomponent) may reduce switching losses (often caused in MOSFETs) in the half bridges, and may reduce the maximum current required for the voltage multiplier.

Figure 6:
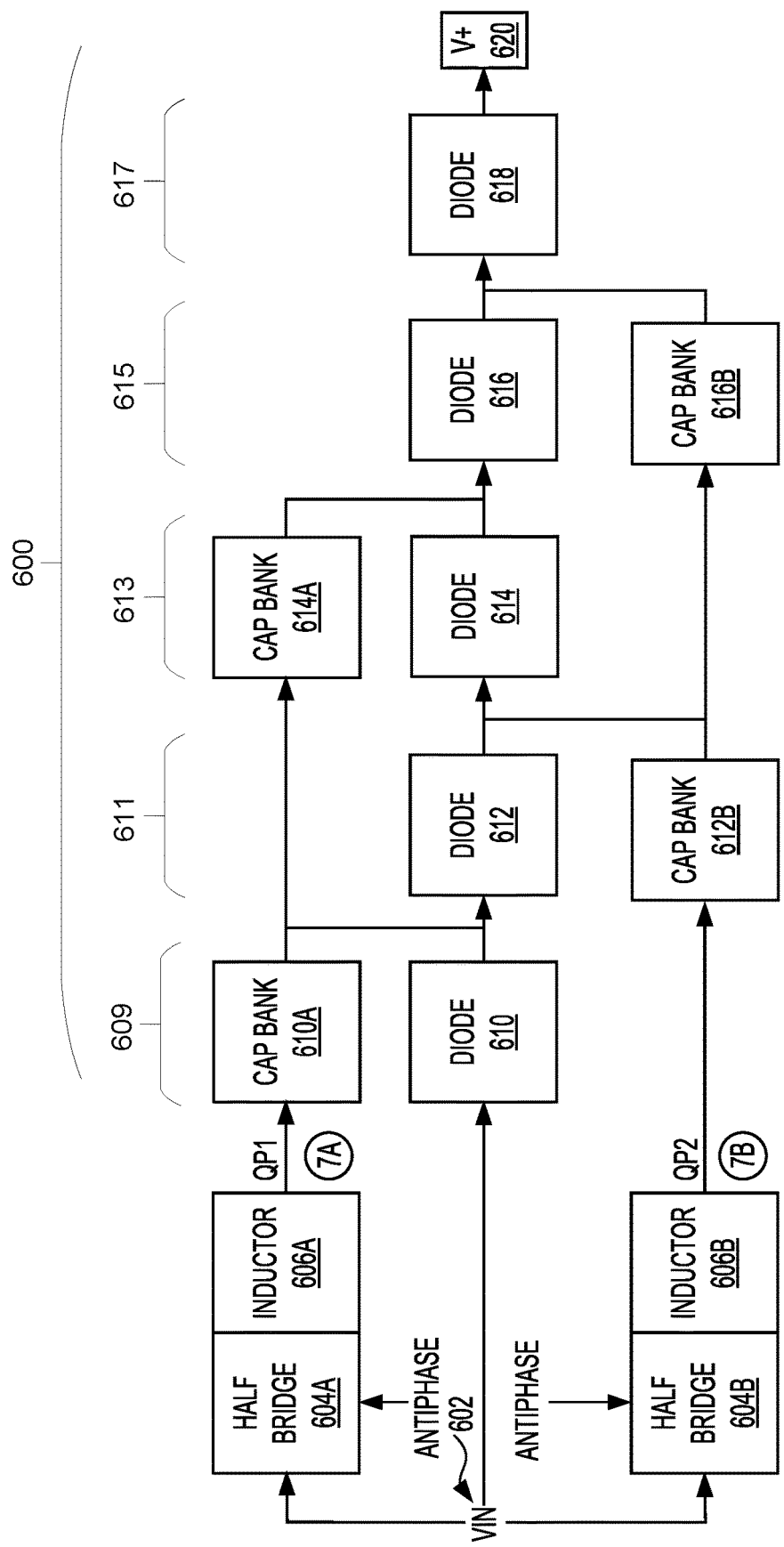
FIG. 6 is a block diagram showing an example non-isolated voltage multiplier integrated with a soft switch, in accordance with a non-limiting embodiment of the present disclosure.

FIG. 6 is a block diagram showing an example non-isolated voltage multiplier 600 integrated with a soft switch 650, in accordance with a non-limiting embodiment of the present disclosure. The soft switch 650 may be a subcomponent of and/or separate component coupled to, the non-isolated voltage multiplier 600. As shown in FIG. 6, the non-isolated voltage multiplier and/or a soft switch coupled to or a part of the non-isolated voltage multiplier may include an input voltage supply 602. The non-isolated voltage multiplier may further include an output voltage supply 620, which, as shown in FIG. 6, may be a positive output voltage supply. The soft switch 650 coupled to or a part of the non-isolated voltage multiplier 600 may further include a pair of half bridges 604A-604B and a pair of inductors 606A-606B. Moreover, the pair of half bridges 604A-604B may be connected, at one end of each half bridge, to the input voltage supply 602. The pair of inductors 606A-606B may be respectively connected to the pair of half bridges 604A-604B (e.g., at the ends of the pair of half bridges that are opposite of the ends connected to the input voltage supply 602). The pair of inductors 606A-606B may also be connected (e.g., on ends of the pair of inductors 606A-606B that are opposite of the ends connected to the pair of half bridges 604A-604B) to one or more capacitor banks of the non-isolated voltage multiplier 600 (e.g., capacitor banks 610A, 612B, etc.). In some aspects, the input voltage supply 602 may be directly connected to the diode (e.g., diode 610) of the non-isolated voltage multiplier 650. In some embodiments, the pair of inductors 606A-606B of the soft switch 650 (e.g., one for each of the anti-phase half-bridges 604A-604B) may be coupled. In other embodiments, the pair of inductors 606A-606B may be uncoupled.

As shown in FIG. 6, the non-isolated voltage multiplier 600 may comprise a plurality of diode stages (e.g., diode stages 609, 611, 613, 615, and 617) serially connected to one another. Each diode stage may include a diode and a capacitor bank. For example, the first diode stage 609 includes diode 610 and capacitor bank 610A, the second diode stage 611 includes diode 612 and capacitor bank 612B, the third diode stage 613 includes diode 614 and capacitor bank 614A, the fourth diode stage 615 includes diode 616 and capacitor bank 616B, and the fifth diode stage 617 includes diode 618. In some aspects, the last (e.g., fifth) diode stage 617 may additionally include a respective capacitor bank (not shown). In other aspects, the last diode stage need not include a capacitor bank. The series of diode stages may be connected to the soft switch 650 at one end of the series, and may be connected to the output voltage supply 620 at the other end (e.g., based on a connection with the diode 618 of the last diode stage 617). For example, the capacitor bank of each of the first and second diode stages (e.g., capacitor bank 610A of the first diode stag 609 and the capacitor bank 612B of the second diode stage 611) may be serially connected to the pair of inductors 606A-606B of the soft switch 650, and the diode 610 of the first diode stage 609 may be connected to the input voltage supply 602.

As shown in FIG. 6, the pairs of inductors and half bridges stemming from the input voltage supply 602 present two conductive paths on which the plurality of diode stages are alternatively aligned (e.g., to facilitate antiphase pulsed inputs through the non-isolated voltage multiplier 600). For example, if for purposes of demonstration, the pair of half bridges comprises a first half bridge 604A and a second half bridge 604B, and if the pair of inductors comprises a first inductor 606A and a second inductor 606B serially connected to the first half bridge 604A and a second half bridge 604B, respectively, one set of diode stages (first set of diode stages) can be aligned with the first half bridge 604A and first inductor 606A, while another set of diode stages (second set of diode stages) can be aligned with the second half bridge 604B and second inductor 606B. Thus, as shown in FIG. 6, the first set of diode stages includes diode stages 609, 613, and 617, while the second set of diode stages includes diode stages 611 and 615. In some aspects, the series of the plurality of diode stages alternate between consecutive stages of the first set of diode stages and the second set of diode stages. For example, as shown in FIG. 6, the series of the plurality of diode stages progresses (from the interface with the soft switch 650 to the output voltage supply 620) from diode stage 609 belonging to the first set, to diode stage 611 belonging to the second set, to diode stage 613 belonging to the first set, to diode stage 615 belonging to the second set, and to diode stage 617 belonging to the first set.

As shown in FIG. 6, an alignment of any given diode stage may be based on whether the respective capacitor bank of the given diode stage is serially connected (directly or indirectly) to a first half bridge 604A and first inductor 606A or to a second half bridge 604B and second inductor 606B. In some aspects, serial connection between the first half bridge, the first inductor, and the first set of diode stages may be referred to as the first line in the non-isolated voltage multiplier 600; whereas the second half bridge, the second inductor, and the second set of diode stages may be referred to as the second line in the non-isolated voltage multiplier 600. The first line and the second line may thus receive antiphase pulsed inputs from the input voltage supply.

Although FIG. 6 shows five diode stages, with the first set of diode stages as comprising three diode stages, and the second set of diode stages as comprising two diode stages, it is contemplated that a non-isolated voltage multiplier described herein may have any number of diode stages. Furthermore, if the first set of diode stages comprises N diode stages, the second set of diode stages can comprise N or N-1 diode stages.

The capacitor bank and diode of any given diode stage of the non-isolated voltage multiplier 600 may be isolated from one another in that given stage. For example, while diodes corresponding to different diode stages may be serially connected to one another, a diode of a given stage is not connected to the capacitor bank of that given stage. Furthermore, while capacitor banks belonging to a given set of diode stages (either the first set of diode stages or the second set of diode stages) may be serially connected to one another, a capacitor bank of a given stage is not connected to the diode of the given stage.

In some embodiments, the soft switch 650 implemented in the non-isolated voltage multiplier 600 may comprise additional pairs of half bridges, additional inductors, and/or may comprise one or more pairs of capacitance stages, as was previously described for soft switch 350 of FIG. 3B. For example, each pair of half bridges of soft bridge 650 may be serially connected to a corresponding pair of inductors, and each pair of inductors may be serially connected to one or more capacitor banks of the non-isolated voltage multiplier (e.g., capacitor banks 610A, 612B, etc.). In some aspects, the soft switch may further comprise another inductor or inductors (referred to herein as a second inductor or second inductors, respectively). Each of the one or more second inductors may be situated between and/or connect half bridges of a given pair of half bridge. In some embodiments, a half bridge may comprise a transistor gate driver (e.g., MOSFET gate driver) that generates a low-side and a high-side signal together. In some embodiments, each capacitor bank may comprise one or more capacitors associated with a given stage of the non-isolated voltage multiplier 600.

In some embodiments, the inductor value of any one or more of the aforementioned inductors may be chosen so that a resonant frequency of the one or more inductors may be significantly below a calculated resonant frequency of the system (e.g., the soft switch). For example, in at least one embodiment, the inductor value, L, may be expressed as $L \gg 1/((2\pi)^2 {*} C)$, where f is the resonant frequency, and C is the total capacitance represented by the plurality of diode stages of the non-isolated voltage multiplier 600.

Figure 7:
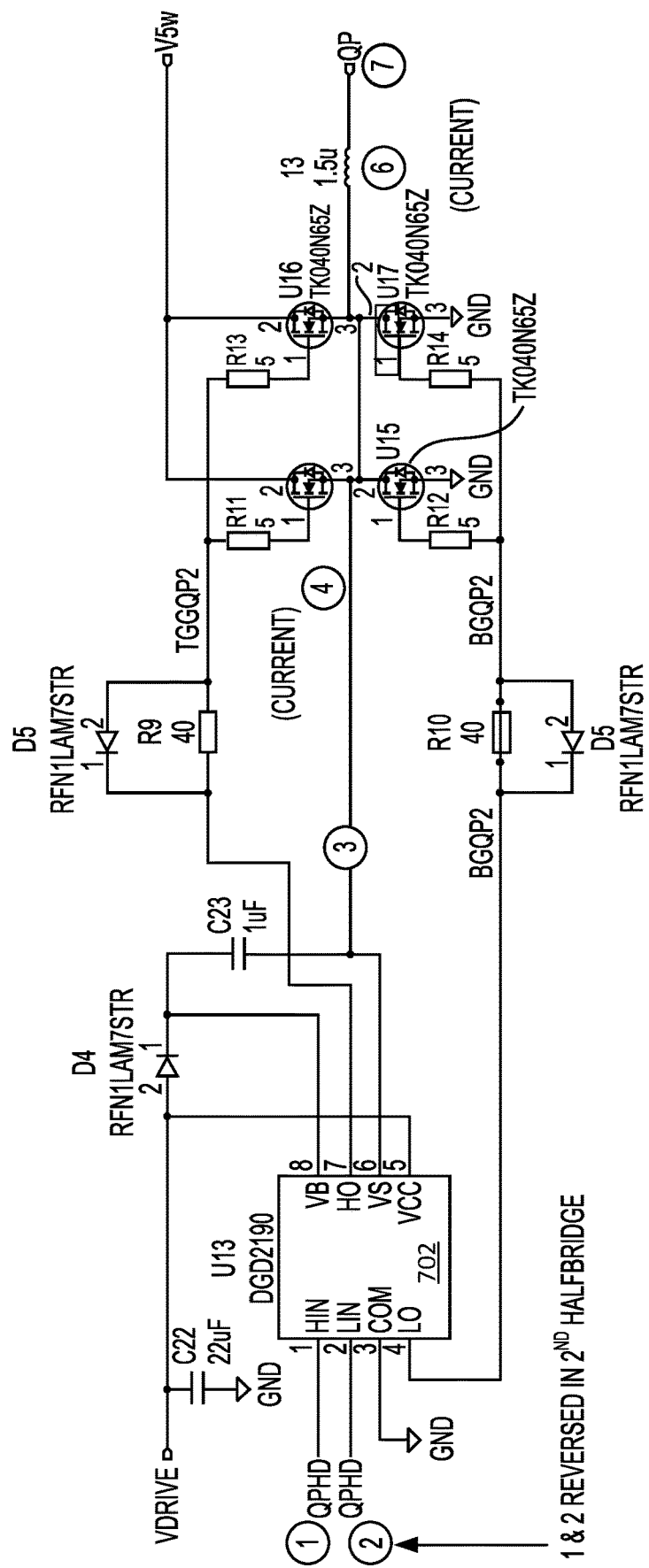
FIG. 7 is a circuit diagram of a portion of an example soft switch integrated with an example non-isolated voltage multiplier, in accordance with a non-limiting embodiment of the present disclosure.

FIG. 7 is a circuit diagram illustrating a portion of an example soft switch used in an example non-isolated voltage multiplier, in accordance with a non-limiting embodiment of the present disclosure. For example, the portion may correspond to an upper or lower portion of the soft switch 650 shown in FIG. 6, where such portion includes the input voltage supply 602, half bridge 604A, inductor 606A, and an interface to a coupled non-isolated multiplier 600. As shown in FIG. 7, the portion includes a power supply unit 702 providing voltage inputs carried through lines (1) and (2) for high and low signals, respectively, at a given time. Although not shown, in the other portion of the example soft switch (e.g., the portion including half bridge 604B and inductor 606B), the positions of lines corresponding to the high and low signals may be reversed so that line (1) carries the low signal and line (2) carries the high signal at the given time.

The portion of the soft switch depicted in FIG. 7 further includes MOSFETs from which current can be controlled (e.g., along line (4)). In some aspects, the half bridge of the portion of the soft switch (e.g., half bridge 604A) may be formed using the plurality of MOSFETs, a line (3) connecting the power supply unit to the MOSFETs. In some aspects, other electronic components may be used in addition to or alternatively to MOSFETs (e.g., diodes, capacitors, etc.) Furthermore, the portion of the soft switch shown in FIG. 7 may further include an inductor (6) to smoothen the current being generated along line (7). For example, the inductor (6) may correspond to inductor 606A shown in FIG. 6, and line (7) may correspond to line 7A shown in FIG. 6, at the interface of the non-isolated voltage multiplier 600.

Figure 8:
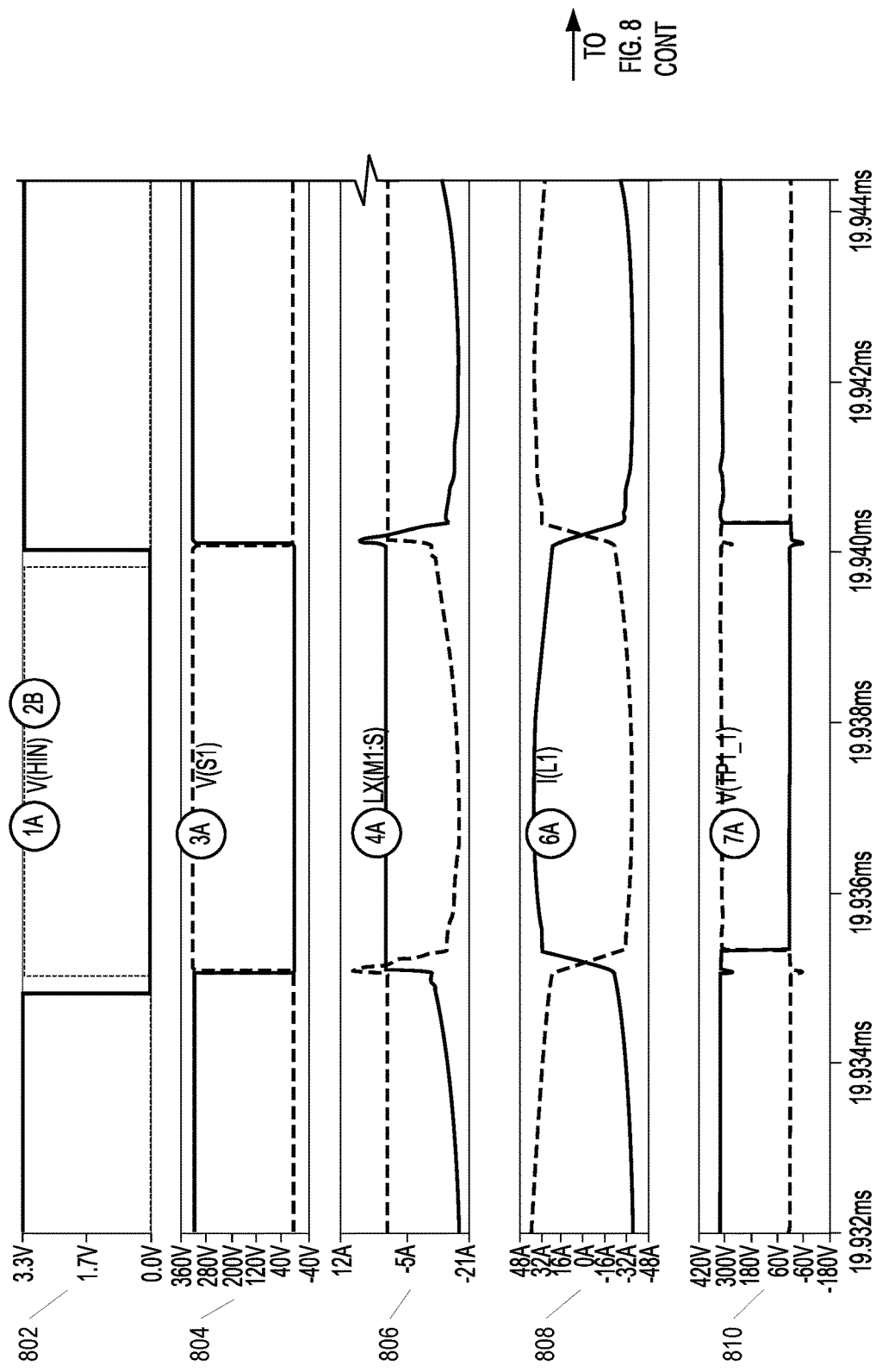
FIG. 8 illustrates example waveforms of certain nodes in the circuit diagram of the portion of the example soft switch integrated with the example non-isolated voltage multiplier of FIG. 7.
Figure 8:
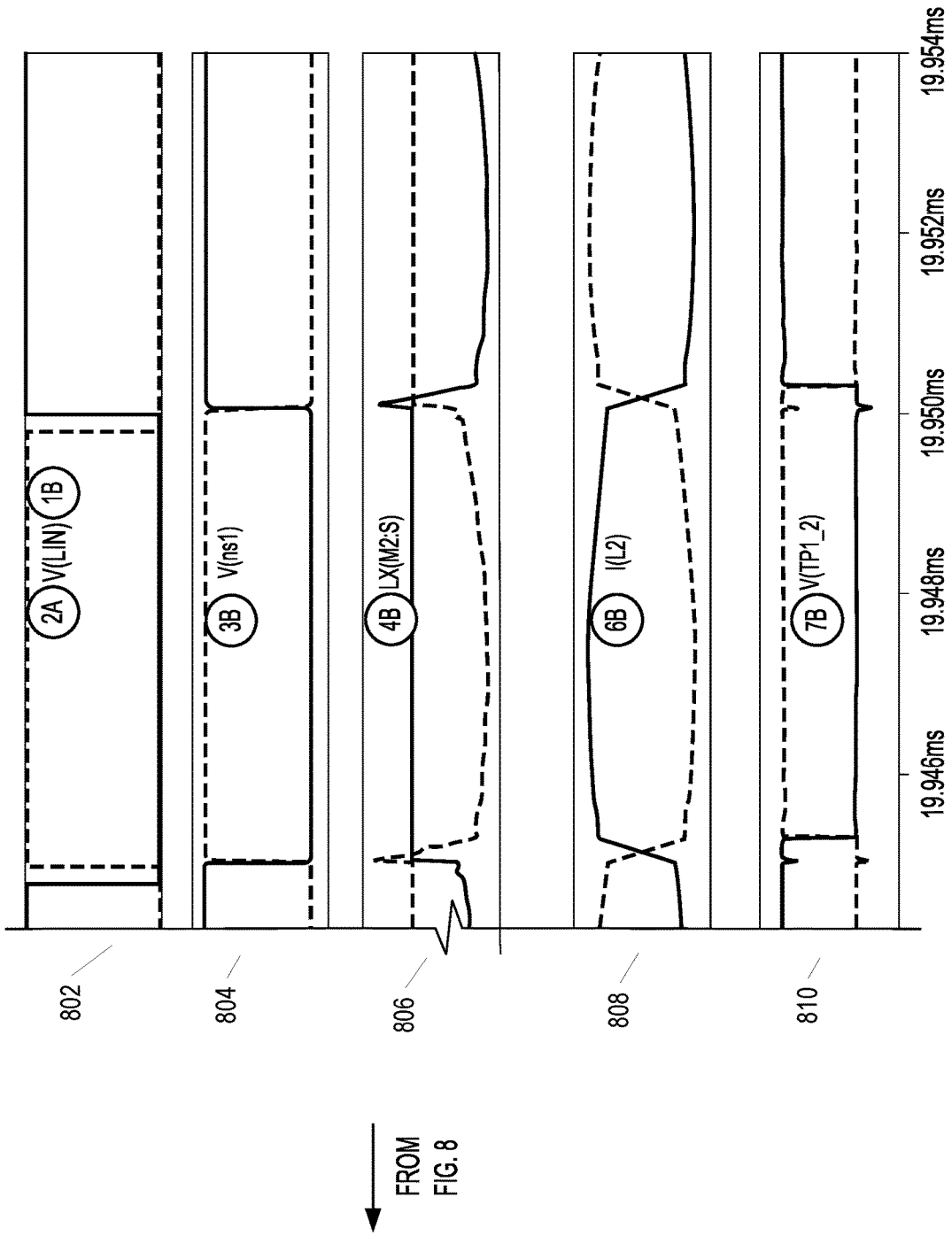

FIG. 8 illustrates example waveforms of certain nodes in the circuit diagram of the example soft switch implemented by a non-isolated multiplier of FIG. 7. As shown in FIG. 8, each graph corresponds to voltage or current measurements at the location of different lines in the circuit diagram of the example soft switch of FIG. 7. For example, graph 802 corresponds to voltage measurements at lines (1) and (2) from the power supply unit 702; graph 804 corresponds to voltage measurements at line (3); graph 806 corresponds to current measurements at line (4) at the half bridge of the soft switch; graph 808 corresponds to current measurements at inductor (6) of the soft switch; and graph 810 corresponds to voltage measurements at the interface of the soft switch and the non-isolated voltage multiplier 600.

Furthermore for each graph shown in FIG. 8, there are two curves that complement one another (e.g., when one curve is high, the other curve is low, and vice versa). The complementing curves represent measurements taken at each portion of the soft switch of FIG. 7. For example, curves 1A or 2B, 3A, 4A, 6A, and 7A may represent measurements taken at lines (1), (2), (3), (4), (6), and (7), respectively from the portion of the soft switch comprising input voltage supply 602, half bridge 604A, and inductor 606A, whereas curves 1B or 2A, 3B, 4B, 6B, and 7B may represent measurements taken at lines (1), (2), (3), (4), (6), and (7), respectively from the portion of the soft switch comprising input voltage supply 602, half bridge 604B, and inductor 606B. Thus, the complementing curves may represent measurements that are antiphase to one another and thus form antiphase pulsed inputs for the non-isolated voltage multiplier 600.

The waveforms of FIG. 8 also show how the various components of the soft switch help to deliver reduction of peak current load, resulting in less costlier components of the apparatus comprising the non-isolated voltage multiplier and the soft switch. For example, graph 806 (showing antiphase current curves 4A and 4B on line (4) near a MOSFET of the half bridge) and graph 808 (showing antiphase current curves 6A and 6B on the inductor (6)) show the effect of integrating a soft switch 650 on to the non-isolated voltage multiplier 600. The antiphase current curves for graphs 806 and 808 are relatively flat because the pair of inductors 606A-606B of the soft switch opposes changes in current over time, causing the antiphase current curves to smoothen over time. Otherwise, if the pair of inductors 606A-606B was not present in the soft switch integrated with the non-isolated voltage multiplier, there would be very high current at the beginning of any given period corresponding to pulses of the antiphase current curves. For example, without the pair of inductors 606A-606B, waveform 806 would have had a sharp initial peak (e.g., drop) at approximately-100 Amps (instead of being slightly under the −21 amps shown). The higher peak currents would have required the use of half bridges with specialized and costlier components that are able to handle such peal currents. The benefit of the placement of pair of inductors 606A-606B is that less costlier components of the non-isolated voltage multiplier and/or the soft switch can be chosen that can have lower current handling capabilities.

In the present disclosure, the terms "including" and "comprising" are used in an open-ended fashion, and thus should be interpreted to mean "including, but not limited to . . . " As used herein, the terms "about," "approximately," "substantially," "generally," and the like mean plus or minus 10% of the stated value or range.

In some examples, the voltage multiplier may be used in a system that may be operated using a computing device. As used herein, the term "computing device" may refer to any suitable device (or collection of devices) that is configured to execute, store, and/or generate machine readable instructions (e.g., non-transitory machine readable medium). A computing device may include a processor and a memory, wherein the processor is to execute machine readable instructions that are stored on the memory.

Reference throughout the specification to "various aspects," "some aspects," "some examples," "other examples," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements may not be provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term 'at least one of X or Y' or 'at least one of X and Y' should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An apparatus for a capacitively coupled multiplier (CCM), the apparatus comprising:
   a positive voltage supply and a negative voltage supply;
   a series of plurality of full bridge rectifier stages connected, on either end of the series, to the positive voltage supply and the negative voltage supply, respectively; and
   a capacitor that is connected, on either end of the capacitor, to the positive voltage supply and the negative supply, respectively, wherein the capacitor is parallel to the series of the plurality of full bridge rectifier stages;
   wherein each full bridge rectifier stage comprises a full bridge rectifier and a respective pair of capacitors, wherein the respective pair of capacitors are located on a pair of lines that run in parallel to the full bridge rectifier;
   wherein, for each full bridge rectifier stage, the full bridge rectifier is coupled, at diametric ends of the full bridge rectifier, to the pair of lines; and
   wherein one end of the pair of lines comprises a pair of antiphase pulsed input ports configured to receive antiphase pulsed inputs.

2. The apparatus of claim 1, further comprising:
   a load circuit that is connected, on either end of the load circuit, to the positive voltage supply and the negative voltage supply, respectively, wherein the load circuit is parallel to the capacitor and is parallel to the series of the plurality of full bridge rectifier stages.

3. The apparatus of claim 1, wherein the antiphase pulsed input ports receive antiphase pulsed inputs from a soft switch.

4. The apparatus of claim 3, wherein the antiphase pulsed inputs received from the soft switch are antiphase direct currents.

5. The apparatus of claim 3, wherein the soft switch comprises:
   a pair of half bridges;
   a pair of first inductors;
   a pair of capacitance stages; and
   a second inductor;
   wherein the pair of half bridges is serially connected to the pair of first inductors, wherein the pair of inductors is serially connected to the pair of capacitance stages, and wherein the second inductor connects the half bridges of the pair of half bridges.

6. The apparatus of claim 5, wherein a resonant frequency of the pair of first inductors or an inductor value of the second inductor is below a total resonant frequency of the soft switch.

7. The apparatus of claim 6, wherein an inductor value, L, of the pair of first inductors or of the second inductor is chosen so that $$L \gg 1/((2\pi f)^2 * C,$$

wherein f is the resonant frequency of the soft switch, and C is the total capacitance represented by the pair of capacitance stages.

8. The apparatus of claim 6, wherein serially connecting the pair of first inductors to the pair of half bridges and the pair of capacitance stages causes the soft switch to generate less heat when operated.

9. The apparatus of claim 6, wherein serially connecting the pair of first inductors to the pair of half bridges and the pair of capacitance stages enables the soft switch to operate at lower transistor current ratings that without the serially connected pair of first inductors.

10. The apparatus of claim 5, wherein the second inductor causes the apparatus to even out its transistor current over a switching cycle.

11. The apparatus of claim 1, wherein the positive voltage supply and the negative voltage supply are electrically isolated.

12. The apparatus of claim 1, wherein a first full bridge rectifier stage of the plurality of full bridge rectifier stages receives an input voltage, wherein a voltage rating of each full bridge rectifier stage of the plurality of full bridge rectifier stages does not exceed a maximum input voltage.

13. The apparatus of claim 1, further comprising:
an active power conversion and boost converter; and
a buck converter;
wherein the active power conversion and boost converter receives alternating current having a first voltage;
wherein the active power conversion and boost converter converts the alternating current into a direct current having a second voltage higher than the first voltage;
wherein the buck converter reduces a voltage of the direct current from the second voltage to a third voltage; and
wherein the capacitively coupled multiplier receives the direct current.

\* \* \* \* \*